United States Patent [19]

Gabriel

[11] 4,054,103

[45] Oct. 18, 1977

[54] TECHNIQUES FOR SAFELY UNLOADING EXTERNALLY-SLUNG HELICOPTER LOADS

[76] Inventor: Edwin Zenith Gabriel, 318-B South St., Eatontown, N.J. 07724

[21] Appl. No.: 651,212

[22] Filed: Jan. 21, 1976

[51] Int. Cl.$^2$ .......................................... B63B 35/52
[52] U.S. Cl. ................... 114/258; 182/139; 214/12; 294/81 SF
[58] Field of Search ............... 114/121, 122; 214/12-14, 15 R; 248/188.2, 188.3; 272/65; 182/139; 294/82 R, 81 SF, 67 DA

[56] References Cited

U.S. PATENT DOCUMENTS

| | | | |
|---|---|---|---|
| 1,267,109 | 5/1918 | O'Laughlin | 182/139 |
| 1,558,567 | 10/1925 | Schein | 114/43.5 AC |
| 2,160,449 | 5/1939 | Weichardt et al. | 114/43.5 AC |
| 2,294,509 | 9/1942 | Moeller | 272/65 |
| 2,807,429 | 9/1957 | Hawkins, Jr. et al. | 114/43.5 AC |
| 3,487,553 | 1/1970 | Stingl | 114/43.5 AC |

Primary Examiner—Trygve M. Blix
Assistant Examiner—Stuart M. Goldstein

[57] ABSTRACT

Precision hover is necessary when one must position a load precisely on the deck of a ship. Manual precision hover is possible under very light wind gust conditions and a calm sea. The techniques described here are directed to those special windy days when a mission must be accomplished. The technique is to unload a containerized cargo onto a platform kept level regardless of the rolling motions of the ship. The platform is a resilient net of the proper strength to absorb the cargo's impact upon its contact with the net. During night operations under adverse weather conditions it is desirable to remove the cargo from the hoisting mechanism manually unaided. This is accomplished by an automatic sling detachment device. Usually the container will approach the net at an angle. This is desirable, enabling one or two of the devices to detach themselves first and permitting the reduction in loading upon the helicopter to be less abrupt. As the load is lowered further all four devices will detach themselves automatically. The container may be moved elsewhere aboard the ship with the aid of a crane. If the container is not moved elsewhere, then it is placed over an inflated pad, having air relief valves, to absorb the load's impact. The pad remains until the ship's cargo is unloaded, when the pads are retrieved to be used again.

11 Claims, 19 Drawing Figures

ARMS' POSITION WITHOUT LOAD
Fig. 13

$D_1 > 2D_2$

ARMS' POSITION WITH LOAD
Fig. 14

TECHNIQUES FOR SAFELY UNLOADING EXTERNALLY-SLUNG HELICOPTER LOADS

BACKGROUND OF THE INVENTION

Much effort has been expended in studies and experimentation for stabilizing medium and heavy lift helicopters and the suspended containerized load for off-shore unloading of a slung load. One objective is to accelerate the unloading operation, particularly when harbor facilities are inadequate or nonexistent. Also guidelines have been suggested for carrying a suspended load faster, easier and more safely. In addition, display system for monitoring the load's position as it is being lowered are being studied. It is rightfully assumed that no amount of electronic stabilization equipment and of pilot effort is capable of providing safety and precision to the unloading operation when the ship is tossing about in rough sea. Reference is made to Army Electronics Command Report of Jan-1973, number AD-756865 "Simulation of Helicopter Containership Loading" which identified the problems. A loading platform kept level on the ship's deck is suggested as a simple solution to a complex problem.

The best accuracy that can be accomplished in precisely positioning a load using ground referenced position, velocity, and acceleration displays and aircraft feedback controls is 1.5 feet in radial ground position, using random wind disturbances of 6ft/sec rms. (US ARMY ECOM-4334 Technical Report AD-A012813 by CM. Tsoubanos dated July 1975). However, placement of a container on a containerized ship or truck bed requires ±4 in. accuracy. It is obvious existing techniques for unloading cargo onto a platform are unsatisfactory even when the platform is stationary. If the loading platform is large enough to accommodate a 1.5 feet radial error and is essentially stationary, then the unloading task from a helicopter can be satisfactorily performed. The techniques described in this invention will enable a safe unloading of an aircraft suspended load onto the deck of a ship at sea.

SUMMARY OF THE INVENTION

A technique for safely unloading externally-slung helicopter loads is accomplished by combining aircraft stabilization equipment and pilot effort with additional automatic control equipment and sensors at the ship's location. The automatic control equipment at the ship's location keeps the loading platform level while the ship is rolling. The net is designed to absorb the impact of a load which may be dropped from a few inches to a foot. If the sea is calm and the containerized load can be placed at the desired location, then instead of a net kept level, an inflated mattress-type cushion can be placed at the unloading location. The container is then lowered onto the cushion which is designed to absorb its impact should it drop a few inches by either the hoisting mechanism or the aircraft's vertical motion. As the load settles on the cushion, its air is automatically allowed to escape through two or more relief values at a predetermined and preset air pressure. The cushion is recovered from its position, such as when the ship's cargo is unloaded. Another requirement is for the hoisting mechanism to be automatically detached from the container upon its placement at its desired location, particularly during adverse weather conditions. The detachment device consists of upper and lower parts-, the lower part being attached to the containerized load and the upper part attached to the hoist. The upper part has two rotatable arm members with teeth pointing upward and the lower part has teeth pointing downward. Under load conditions, the teeth of the two parts are in engagement. Under no-load conditions, the teeth are disengaged and light springs attached to the upper pivoted arm members automatically rotate the two arms away from the lower member, enabling the two parts to separate. The cable with the upper part of the detachment device are lifted by the hoisting mechanism to be used again on another load. Each load must be equipped with the lower part in order for this technique to be used, and for the unloading of containers placed on platforms to be unmanned.

The foregoing and further objects features and advantages of this invention and its utility will be recognized with reference to the foregoing description and appended claims, taken in conjunction with the illustrated embodiments set forth in the accompanying drawings.

BRIEF DESCRIPTION OF THE DRAWINGS

For the purpose of illustrating the invention, there are shown in the drawings forms thereof which are presently preferred. It is to be understood, however, that this invention is not necessarily limited to the precise arrangement, instrumentalities and field of utility as therein demonstrated.

DESCRIPTION OF THE PREFERRED EMBODIMENTS

Figure 1:
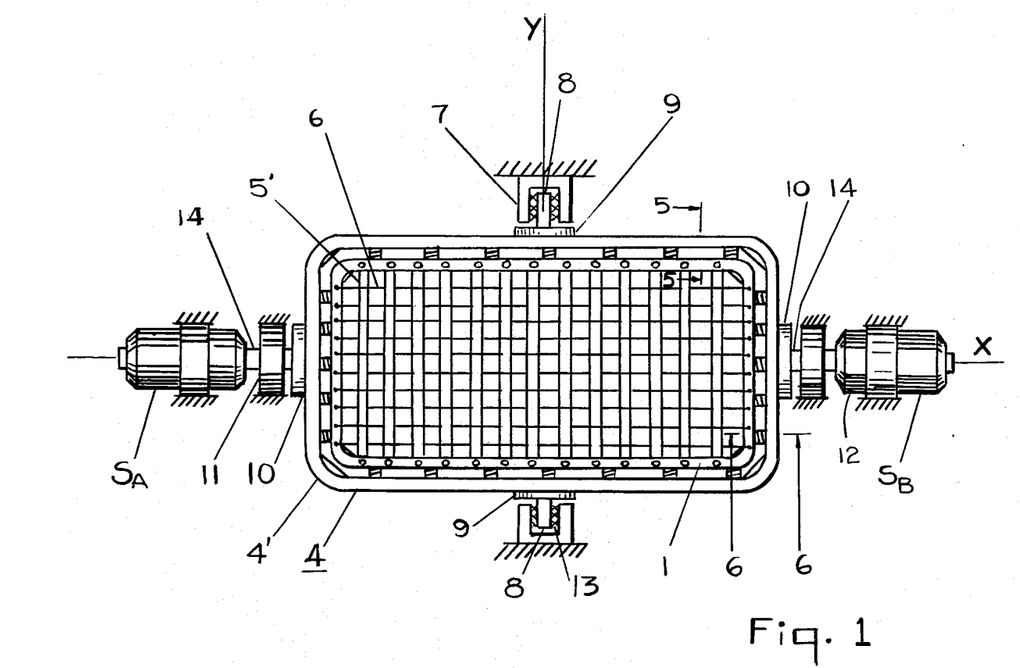
FIG. 1 shows a top view of the loading platform, a metal net assembly, supported by an outer frame, capable of being oscillated by the servomotors shown.

A less complicated scheme for unloading a containerized load onto a ship's deck at sea without adding anything to the weight or complexity of the hoisting mechanism is depicted in FIG. 1. In this scheme, a net designed to receive the weight of the load is kept level with the aid of a referenced tilt sensor and an electromechanical servo-mechanism, shown in block diagram form in FIG. 7. The net assembly enables the cargo to be unloaded onto it, even though the ship underneath may be rolling. Usually the ship's pitching motion is considerably less than its rolling motion. The pilot endeavors to keep his helicopter in motionless hover above the net as he lowers the container, as shown in FIG. 8. Usually there is someone aboard the ship as well as aboard the aircraft watching the load's descent and signaling to the pilot of its position. When the load is a few feet above net 4, the pilot would slow up the rate of descent to avoid a heavy dynamic impact on net 1 upon contact. Net 1 includes just the inner frame, bands 5 or 5' and wires 6.

Figure 2:
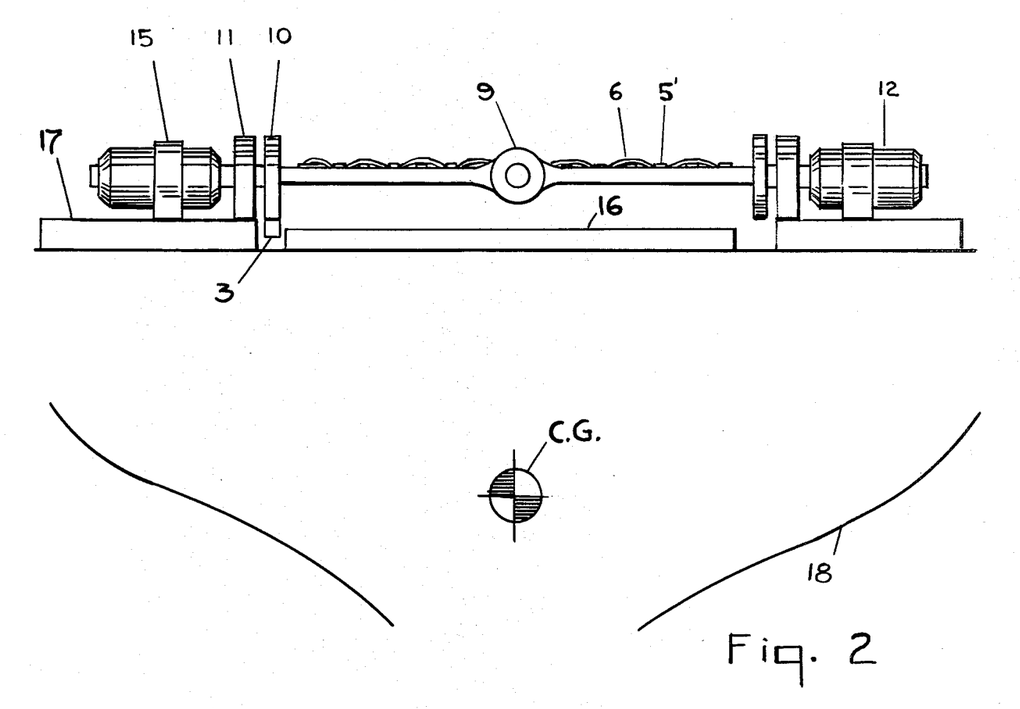
FIG. 2 is a side view of the net, frame and servo motors supported on the ship's deck. The inclinometer for sensing the net's horizontality is also indicated.
Figure 3:
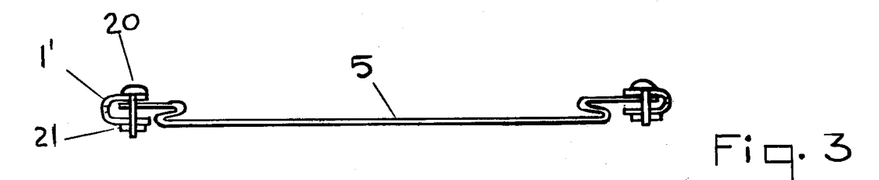
FIG. 3 shows a band of the net, including its method of support. The band is shown with an s-shaped bend at each end, so oriented as to prevent the load from slipping off the net.
Figure 4:
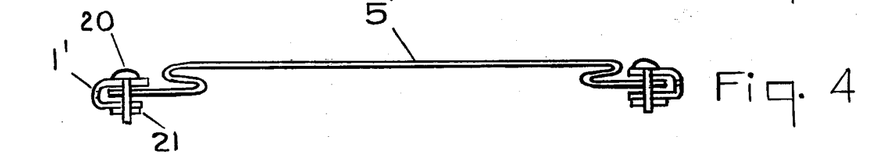
FIG. 4 shows the same band turned upside down, to enable it to carry a greater load without permanent distortion.

Since the net is resilient due to tension springs 2, the net should absorb the most of the impact of the container as it makes contact with itself. Because net 4 is kept level with the aid of inclinometer 3 and the aircraft pilot attempts to keep container 30, FIG. 8, level, the contact between the two should be made smoothly; that is, the touch down should not be unduly lopsided. The construction of the net assembly 4 is shown in FIGS. 1, 2, 3, 4, 5 and 6. Numeral 4', FIG. 1, points to its outer frame. Heavy springs 2 support inner frame 1'. The net consists of bands 5 interwoven with high tensile strength wire 6. Servo motors 12 oscillate frame assembly 4 by way of their shafts 14 rigidly connected to collars 10, attached to outer frame 4'. The motors have integrated gear trains and tachometer generators as indicated in FIG. 7. In addition to its high strength, outer frame 4' is assisted from twisting which may be caused by the load's impact by guides 8 attached to the center portions of frame 4'. Guide 8, including collars 9, is held in place by stationary U-shaped channels 7. Friction between the stationary and moving parts is minimized by linear bearings 13. The servometer receives an amplified signal from inclinometer 3 attached to underside of collar 10, and operates to keep net assembly 4 level. Motors 12 are supported on platforms 17, rigidly fastened to the ship's structure 18. A resilient inflated mat 16 is located directly underneath net 4 designed to absorb the impact of load 30 should the net fail to support the load outer perimeter of inlfated mat 16 is approximately the same as that of outer frame 4', as shown in FIG. 2. FIG. 3 illustrates an edge view of a single band 5 of the net. Band 5 is shown with an s-shaped configuration at each end, so shaped to prevent the load from slipping off the net and simultaneously to help absorb the load's impact. FIG. 4 illustrates an edge view of a single band 5' of the net. Band 5' also is shown s-shaped at each end but in the reverse direction of band 5. The S-shaped folds help absorb the load's impact while retaining its form better than the orientation shown in FIG. 3. The band's ends are held in place by bolts 20 passing through holes in frame 1' and band 5. The bolts are retained in place by lock nuts 21.

Figure 5:
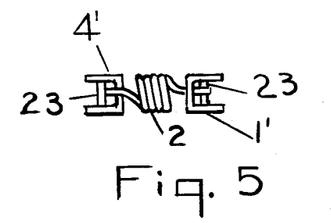
FIG. 5 is a partial sectional view of the frame along lines 5—5 of FIG. 1 showing one way in which the coiled springs of the net support may be held in place.

FIG. 5 is a partial sectional view of frames 1' and 4' taken along lines 5—5 of FIG. 1 showing coiled spring 2 and its ends held in position inside frame channels by lock nuts 23. Ends of spring 2 are threaded to accept nuts 23.

Figure 6:
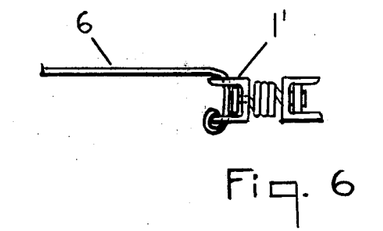
FIG. 6 is a partial sectional view of the inner frame taken along lines 6—6 of FIG. 1 showing one way in which the spring wires of the net may be held in place.

FIG. 6 illustrates a partial sectional view of frames 1' and 4' and side view of wire 6 taken along lines 6—6 of FIG. 1 showing how the ends of spring wire of net are held in place. Each end of spring wire passes through holes in channel of frame 1' and then bent around edge into inside of channel, as shown in FIG. 6.

Figure 7:
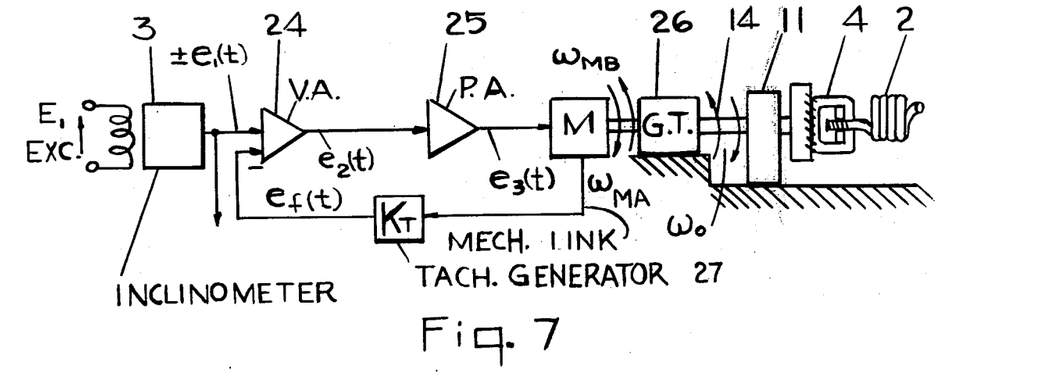
FIG. 7 is a block diagram of the servo positioning system for oscillating the net assembly so as to keep the outer net frame level in the presence of the ship's rolling motions.
Figure 8:
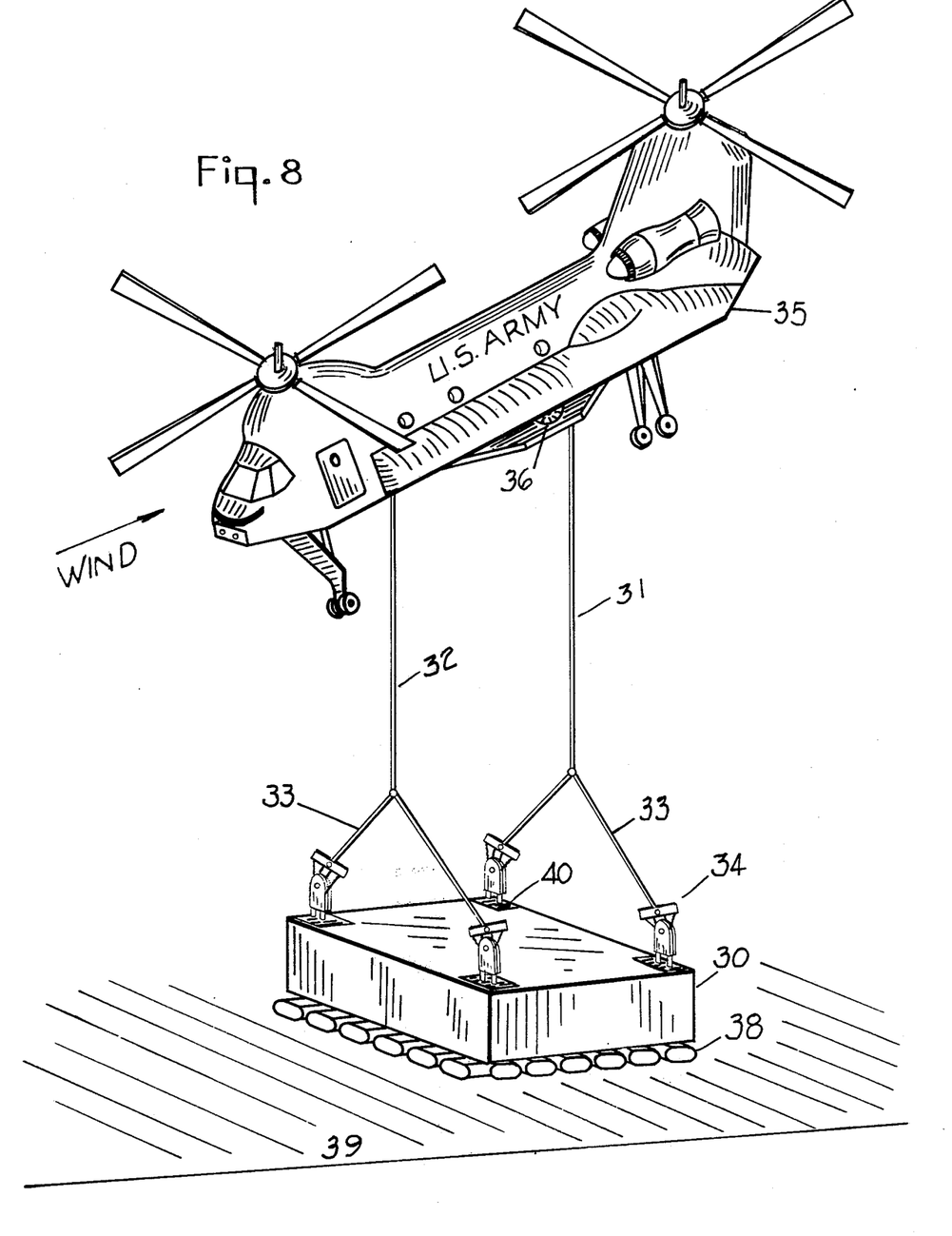
FIG. 8 shows a perspective view of the aircraft, two-winch, two-point suspension system and containerized load. An inflated pad is shown directly beneath the load, instead of the net shown in FIG. 1.

FIG. 7 shows a block diagram of the electromechanical servo mechanism for keeping net assembly 4 level in the presence of the ship's rolling motions. The diagrams for both servomotors 5A and 5B are the same. Two servosystems are shown in FIG. 1 in order that the strain on the outer frame and on the motor may not be too great. When the load makes contact with the net, very high stresses could be introduced to both the frame and the motor, depending on the force of the impact, tending to produce more of a twisting effect on outer frame 4' if a single motor were used to maintain a level platform for the containerized load. The signal for keeping net assembly 4 level is received from inclinometer 3, a referenced tilt sensor manufactured by Schawitz Engineering of Pennsauken, N.J. Model LSPP, which measures 1.60 inches high and 1.50 inches in diameter in suggested. For simultaneously sensing angular motions along two orthogonal axes, such as along both roll and pitch, model LSFPA is suggested. The sensor's output signal is proportional to the sine of the angle of tilt from as little as ±1° to ±90° full scale. This signal $e_1(t)$ is applied to voltage amplifier 24, then signal $e_2(t)$ is applied to amplifier 25. The latter output signal $e_3(t)$ is applied to servomotor 12. The servomotor is either integrally or mechanically linked to both a tachometer generator 27 and to a gear reduction head 26. The amount of reduction in angular speed would depend on the speed capability of the motor. If a dc motor, it would depend on the number of poles. Gear head 26 is coupled to frame collar 10 by shaft 14. Shaft 14 is supported by bearing block 11. Signal from generator 27 is applied to amplifier 24 in a negative sense in order to have a damping effect on the system and avoid unwanted oscillations of the net assembly.

Figure 9:
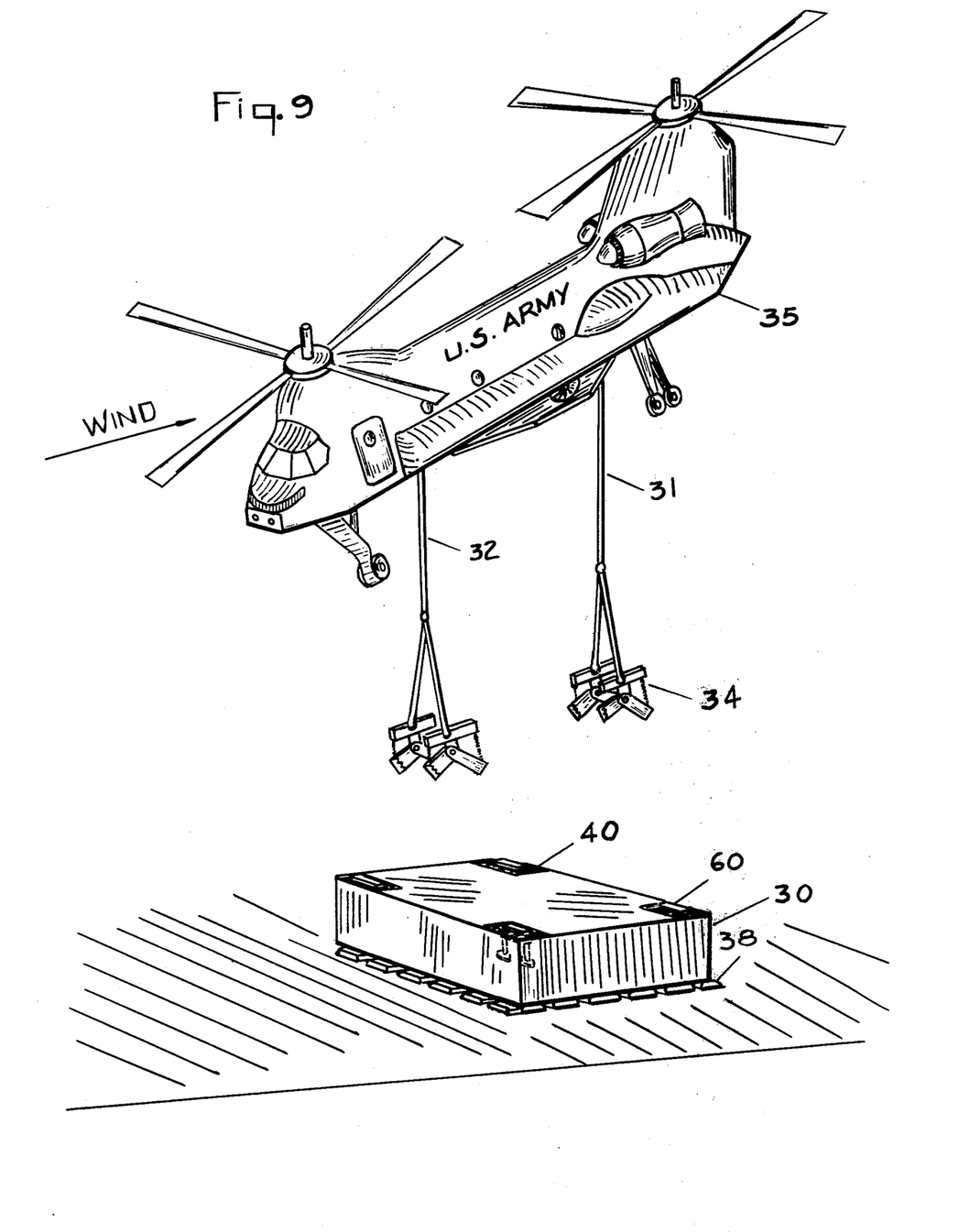
FIG. 9 shows a perspective view of the aircraft and load suspension system disengaged from the containerized cargo. The pad beneath the load is shown deflated.
Figure 15:
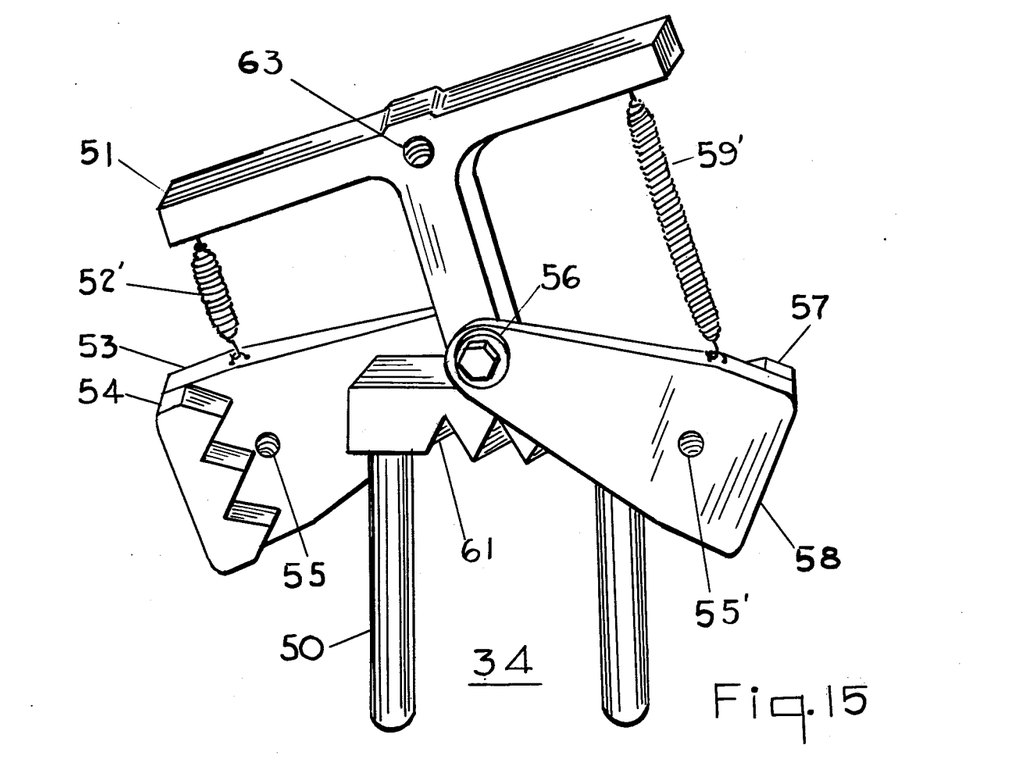
FIG. 15 shows a perspective view of the sling detachment device with upper and lower parts in disengagement with one spring longer than the other for the condition when the hoist cable is connected to T-shaped bar and is in tension at an acute angle.
Figure 16:
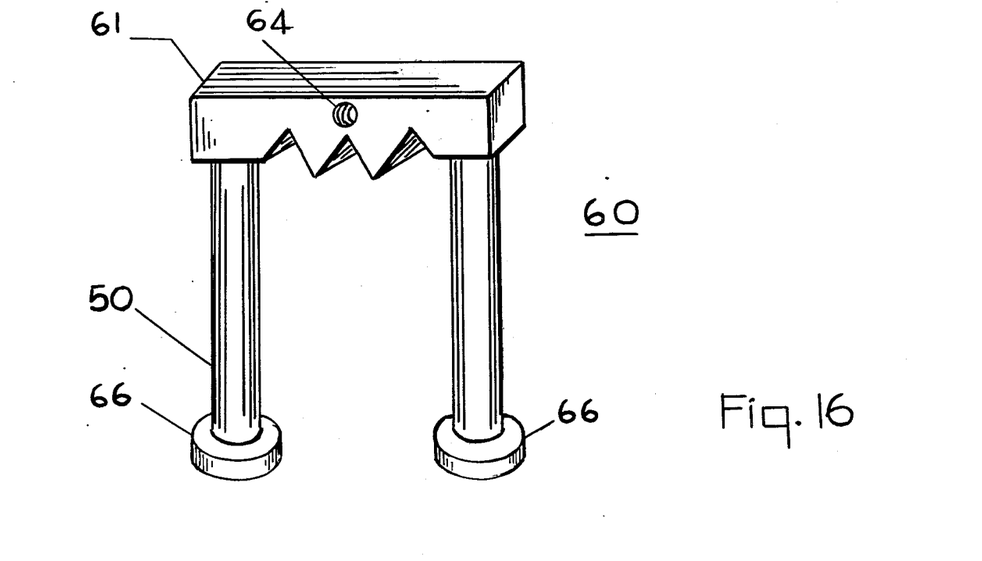
FIG. 16 shows a perspective view of the lower part of the detachment device, the part which is attached to the load.

The helicopter-suspended-load system is illustrated in FIG. 8. It is desirable for the helicopter 35 to be facing the wind, as shown, in order for it to maintain its hover position more easily. A two-point suspension system for the load is shown. The hoisting mechanism would be the one already existing for the tandem-rotor heavy or medium lift helicopter. Either one or two motors 36 may be used for raising or lowering the load. In the case of a single motor, two clutches, one on each shaft end of a motor with a double shaft, would be used, so that one cable 32 may be raised or lowered more than cable 31. Directly beneath load 30 is inflated pad 38 to assist the impact of the load's contact with platform 39. In this illustration, the alternate technique of using a pad instead of a net assembly is portrayed for absorbing sudden load impacts. The inflated pad could be placed over another containerized load. When container 30 is positioned over pad 38 and allowed to rest upon it, attached relief values expell the air from pad 38 until they flatten out as in FIG. 9. Notice that load 30 is supported by four devices 34 shown in FIG. 15. Each of these devices has two parts which are in engagement until the tensions in cables 33 are completely relieved. When the tension in a cable is sufficiently relieved, then that sling device 34 is automatically detached from its lower part 60, as shown in FIGS. 15 and 16. FIG. 9 shows load 30 settled and resting on pad 38. Hoist mechanism of helicopter 35 has lifted detached parts of sling devices 34. Deflated pad 38 is left as is and recovered when ship is unloaded unless it is desirable to relocate load 30 with the aid of a crane or derrick. The helicopter is now ready to fetch another load and return to the loading platform. A recess area 40 at each of four corners is provided either in container 30 or in a cradle supporting container 30. The recessed plate enables rods 50 of FIG. 16 to receive the lower part 60 and not interfere with another container placed over it. The recess has holes 76 to receive rods 50. The recessed area includes implanted plate 75, FIG. 19. Lower part 60 cannot be removed because of disks 66 firmly attached and fastened to ends of rods 50. Rods 50 step into holes of a solidly implanted plate loaced in each of four recesses 40. Another container placed over container 30 would push down bar 61 of lower part 60 into recess 40 so that its surface would be flush with container 30's surface.

Figure 10:
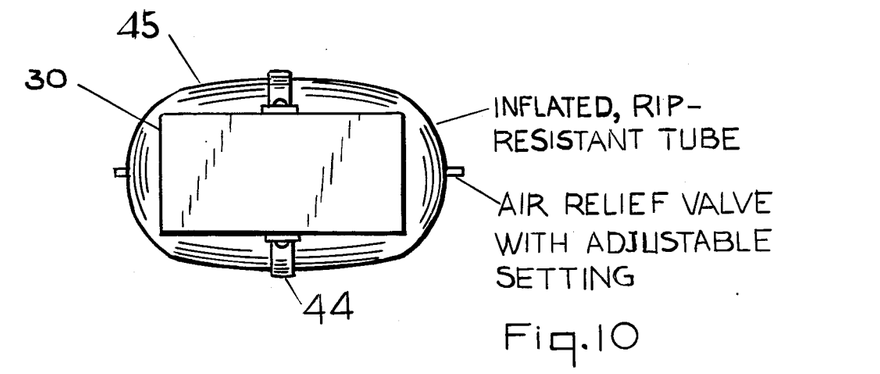
FIG. 10 shows a top view of the cargo container with an inflated tube surrounding its periphery.
Figure 11:
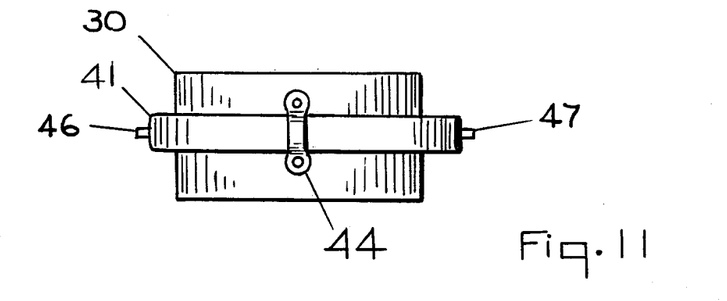
FIG. 11 shows a side view of the cargo container.

In FIGS. 10 and 11, inflated tube 45 is shown surrounding the periphery of containerized load 30. Straps 44 on opposite sides of load hold inflated tube in place. The tube's purpose is to protect the load against unforeseen unusual ship or aircraft motions. Tube 45 is capable of withstanding the impact of itself against an adjacent container in the loading area. To provide additional resiliency, internal air may be expelled through relief valves 46 and 47 with adjustable settings.

Figure 13:
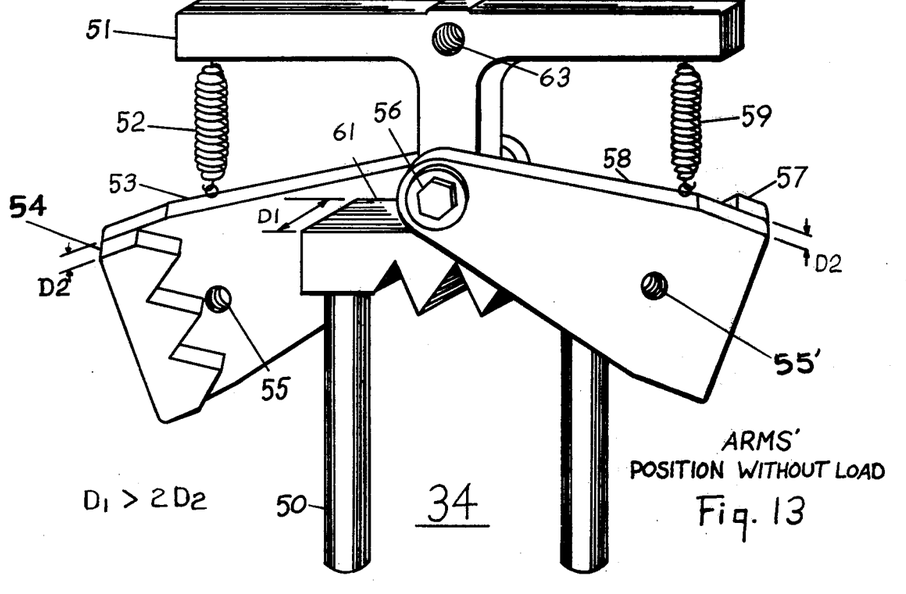
FIG. 13 shows a perspective view of the automatic sling detachment device with both upper and lower parts in disengagement, the unloaded position of the device.
Figure 14:
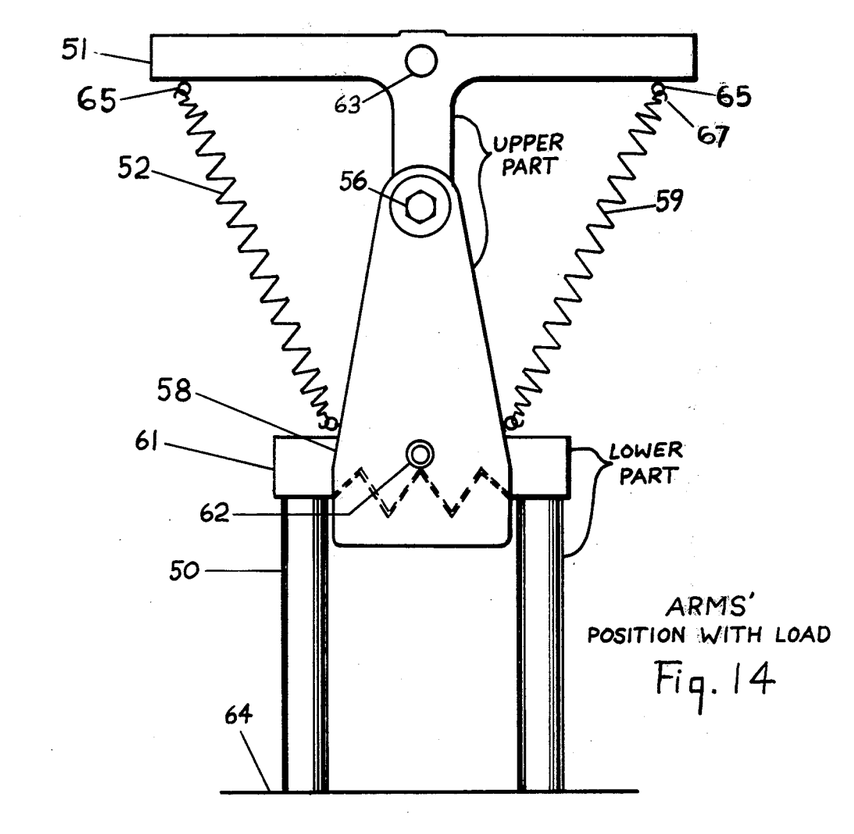
FIG. 14 shows a perspective view of the sling detachment device with the upper and lower parts in engagement, the loaded position of the device.

A purpose of the automatic sling detachment device is to enable container 30 to be removed from the hoist mechanism without human aid, particularly for a ship in rough seas. In rough seas it would be unsafe for a person to be manually detaching hoisting cable hooks from, say, loops fastened onto container 30. Also, with automatic detachment, the unloading operation would progress faster. The detachment device consists of two independent parts, an upper and a lower, as shown in FIGS. 13 to 16. The upper part, attached to the hoist cable, has two identical swingable arms 53 and 58 and T-bar 51 with a single bolt 56 passing through all three at the location shown in FIG. 13. At the lower inside surface of each arm 53 and 58 is firmly attached a deep saw tooth member, as shown in FIG. 13, with the teeth pointing upward. Light springs 52 and 59 hold arms 53 and 59 up and away from the lower part 60, FIG. 16, when hoist cable supporting load 30 is completely loose. Eye hooks 67 at ends of springs 52 and 59 are held in position by eye screws 65. Lower part 60 consists of an upper bar 61 having teeth along its underside portion, to match the teeth of the upper part, and rods 50 extending from each end of underside of bar 61. Rods 50 are capable of extending into corresponding holes at each corner of container 30. It should be noted that in FIG. 13, distance or thickness $D_1$ is greater than twice distance or thickness $D_2$, in order to avoid friction or contact between surfaces of teeth 54 and 57, when arms 53 and 58 swing apart with the aid of light tension springs 52 and 59. Members 53, 61 and 58 contact each other along highly polished surfaces in order to minimize friction between moving parts. When lower and upper parts are in assembled position, the pin 62 may be inserted through holes 55, 55' and 64 in the swingable arms and upper bar 61. Thus, pin 62 enables the above members to remain assembled until the hoist hooks for suspending load 30 are inserted in hole 63 and cables 33 are in tension. Ends of cables 31 and 32 include hooks of the required structural strength for insertion into hole 63 to serve to lift each of the four automatic sling detachment devices, shown in FIG. 15. The above-mentioned hoist hooks refer to the hooks attached to ends of cables 31 and 32. When container 30 is ready to be lifted, pin 62 is removed. If detachment device should be held at an angle as in FIG. 8, then one spring 59' will be longer than the other in its retracted or no tension condition. Then the tension in both springs 52' and 59' would be the same when load 30 is suspended. This configuration is shown in the perspective view of FIG. 15, with spring 59' longer than spring 52' so T-bar will be angularly positioned with the two springs in their no tension condition. FIG. 16 shows a perspective view of the lower part by itself. Disks 66 are fastened to the ends of rods 50 after they have been inserted into appropriate holes in recess 40 of container 30.

Figure 17:
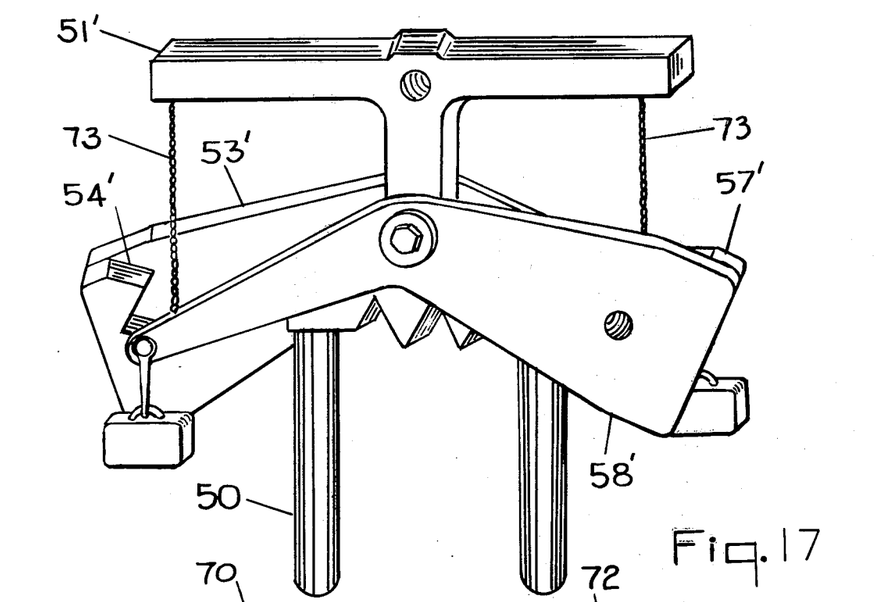
FIG. 17 shows a perspective view of sling detachment device in which weights instead of springs automatically rotate its two arms away from its lower part, attached to a load, when the suspended load settles upon a platform below and the tensions in the hoisting cables are relieved.
Figures 18, 19:
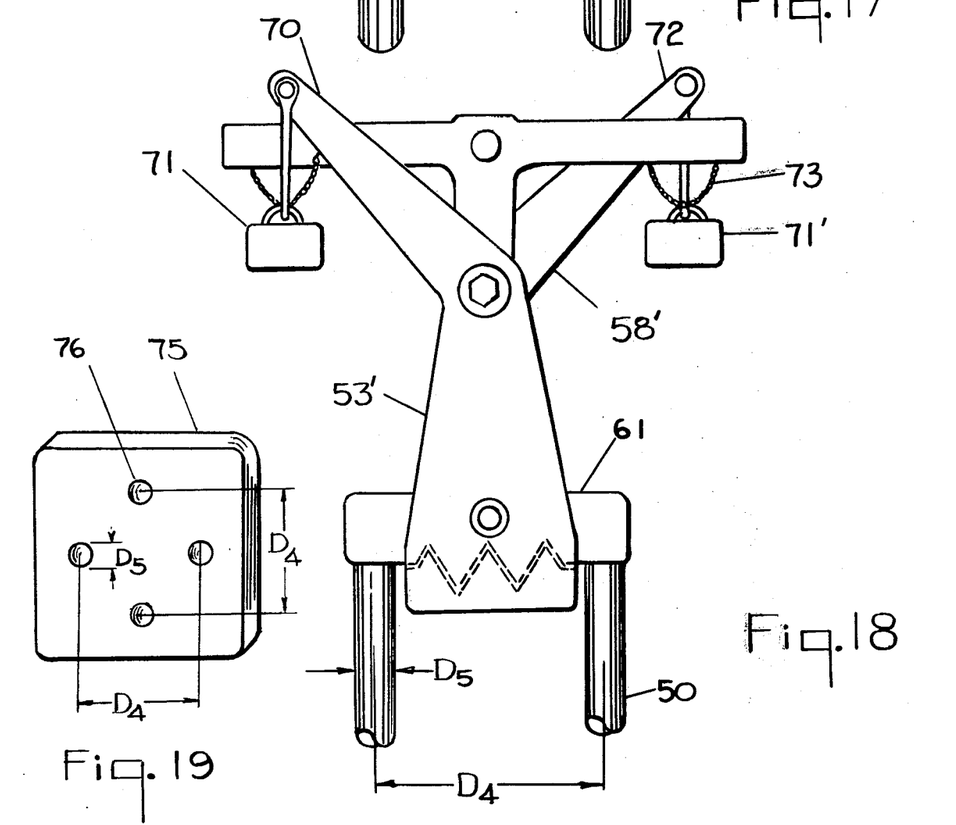
FIG. 18 shows a front view of the same detachment device shown in FIG. 17.
FIG. 19 shows a perspective view of a rectangular plate, one of four to be imbedded in each of four corners of a containerized load, to retain the lower part of the detachment device shown in FIG. 16.

Another configuration for the automatic detachment device is shown in FIG. 17. The technique for automaticaly disengaging itself from the containerized cargo when unloading is the same as in FIGS. 13 and 14. Instead of using springs for lifting rotatable arms 53 and 58, weights 71 and 71' supported by extentions 70 and 72 of arms 53' and 58' are used. The amount that weights 71 and 71' will raise arms 53' and 58' would depend on just how much counterbalance is afforded by arm portions 53' and 58' in comparison to the magnitude of weights 71 and 71'. FIGS. 17 and 18 correspond to FIGS. 13 and 14, in that FIG. 17 represents the disengagement configuration of the upper and lower parts while FIG. 18 illustrates the parts of the device in engagement under load conditions. In FIG. 18, pin 52 keeps parts in engagement since no load tension is shown lifting T-bar 51. The number and depth of teeth in members 54' and 57' may be more or less than shown depending upon the design requirements for the specifics of the unloading system, including the maximum weight of the containerized cargo handled.

It should be mentioned that the shape of net assembly 4 may be circular or square instead of rectangular, as shown in FIG. 1. A circular or square shape would enable helicopter 35 to be oriented in any direction it wishes to face the wind without being too concerned about the angular orientation of the container in the horizontal plane. An alternative would be to rotate the bed or platform on which net assembly 4 is supported.

This would mean a sturdy support bed capable of being rotated, say by gearing.

The imbedded plate identified by numeral 75 in recess 40 may have two sets of holes, as shown in FIG. 19, so that rods 50 of lower part 60 of device 34 may be held in place in either of two orthogonal directions, depending on the desired orientation of device 34. Hole distances $D_4$ in plate 75 would be identical to the spacing between rods 50, and rods 50 would fit into holes 76 with a close tolerance. Chains 73 limit the descent of arm extensions 70 and 72.

Figure 12:
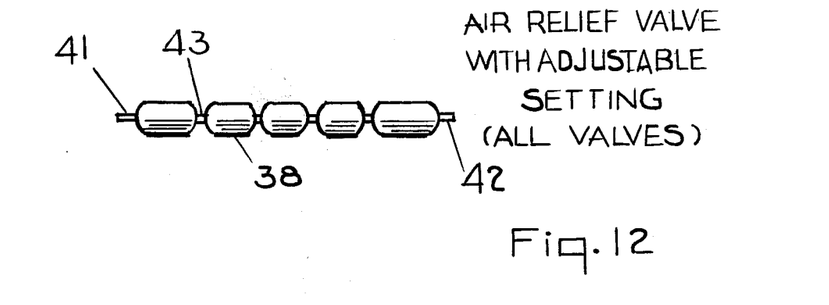
FIG. 12 shows an end view of the inflated pad for placement under the load.

Mat or pad in FIG. 12 is reinforced with nylon and high tension wire and constructed of rip-resistant woven material capable of being inflated to withstand the impact of the largest containerized weight. The air pressure to which pad is inflated would depend on the container's weight so that its internal air would expel whenever the weight in contact exceeded the settings of the relief valves. A suggested source of the relief valves is Nupro Company of Solon, Ohio 44139. It is desirable to use valves whose relief pressure is adjustable. In order for inflated mat 38, FIGS. 3 and 12, to have essentially a flat surface, mat is shown compartmentalized. However, air is permitted to pass from one compartment to another through restricted opening 43. FIGS. 10 and 11 show views of load 30 fitted with an air inflatable tube 45 held in place by straps 44. Tube 45 is capable of withstanding the impact of itself against an adjacent container in the loading area. Tube 45 is fitted with two or more air relief valves.

I claim:

1. A load supporting system for safely unloading a containerized load from hoisting cables onto a ship platform comprising:
    a rectangular - shaped net to support heavy loads while maintaining a level position along one of its two axes when supported by a platform moving angularly, said net attached to a rectangular - shaped inner frame, said inner frame supported by a rectangular outer frame by means of coiled tension springs, a stationary servo motor mounted on said ship and a tilt sensor attached to said outer frame responsive to the angular roll position of said ship in order to provide a horizontal reference, a mat having essentially a flat surface provided beneath said net for cushioning said cargo in case any part of said net should fail, said tilt sensor sensitive to any departure of said outer frame from a horizontal position along one of its two orthogonal axes, producing an output signal proportional to the magnitude of the angle of tilt from the horizontal to cause said servometer to rotate and keep said net level along one of said axes.

2. A load supporting system in accordance with claim 1, wherein said outer frame is prevented from twisting by said load's impact upon said net by guides attached to the center portion along said frame's longitudinal axis, said guide held in place by stationary U-shaped channels having linear bearings, friction between stationary and moving parts being reduced by said linear bearings.

3. A load supporting system in accordance with claim 1, wherein said net has numerous narrow bands extending from one side to the opposite side of said inner frame, the end of each band provided with means for being firmly supported by said frame, and each of said bands provided with S-shaped folds near each said end to assist in absorbing the force of impact of said load when it is lowered onto said net.

4. A load supporting system in accordance with claim 1, wherein said mat is air-inflated, rip-resistant and capable of withstanding and absorbing the weight of a heavy load placed upon said surface.

5. A load supporting system in accordance with claim 4, wherein said mat is provided with two or more air relief valves to gradually and uniformly expel its air as said load settles on said mat.

6. A load supporting system in accordance with claim 1, wherein said load is provided with an inflated tube surrounding its periphery, said tube being provided with at least one combination air relief and air extraction valve to remove said tube's air after said load has been placed on said ship.

7. A load supporting system in accordance with claim 1, wherein said load is provided with at least one automatic sling detachment device to enable said load to be freed of said hoisting cables, each said device comprising an upper part A and a lower part B:
    wherein upperpart A comprises and independent part having two exterior rotatable arm members and a central T-shaped support member; the lower inside end of each rotatable arm member being attached to a triangular teeth-shaped submember with the teeth pointing upwardly; the said three members being held together by a single low friction bolt; a light tension spring holding the lower end of each arm member upward, when said upper part is separated from a lower part;
    wherein lower part B comprises an independent part having an upper horizontal member with a thickness greater than the thicknesses of said two rotatable arm members, having teeth pointing downwardly along its center portion to match the teeth of said arms of said upper part, said horizontal member being supported by two rods attached to the underside of said horizontal members at its opposite ends; said upper and lower parts having their upper and lower teeth in engagement when the rods of the lower part are attached to a load and said T-shaped member is under tension, such as when suspended by a hoist cable; when said teeth are engaged, said rotatable arms being aligned and said springs being extended; when said load is positioned on said platform so tension on said hoist cable is relieved, said teeth being disengaged and said rotatable arms being automatically sprung apart under the tension of the spring the two said parts, upper and lower, thus separating from each other, the engaged teeth being the only contacts keeping said parts together.

8. A load supporting system for safely unloading a containerized load from hoisting cables unto a loading platform comprising:
    1. a sufficiently large mat having an essentially flat surface, capable of withstanding and absorbing the weight of a heavy load placed upon its surface from said hoisting cables
    2. said load provided with at least one automatic sling detachment device to enable said load to be freed of said hoisting cables, each said device comprising an upper part A and a lower part B:
    wherein said upper part A comprises two exterior rotatable arm members and a central T-shaped support member; the lower inside end of each rotatable arm member being attached to a triangular teeth-shaped submember with the teeth pointing upwardly; the said three members being held together by a single low friction bolt; a light tension spring holding the lower end of each arm member upward, when said upper part is separated from a lower part; wherein each lower part comprises an independent part having an upper horizontal member with a thickness greater than the thicknesses of said two rotatable arm members, having teeth pointing downwardly along its center portion to match the teeth of said arms of said upper part, said horizontal member being supported by two rods attached to the underside of said horizontal member at its opposite ends; said upper and lower parts having their upper and lower teeth in engagement when the rods of the lower part are attached to a load and said T-shaped member is under tension, such as when suspended by a hoist cable; when said teeth are engaged, said rotatable arms being aligned with said springs being extended; when said load is positioned on said platform so tension on said hoist cable is relieved, said teeth being disengaged and said rotatable arms being automatically sprung apart under tension of the spring; and the two said parts, upper and lower, thus separating from each other, the engaged teeth being the only contacts keeping said parts together.

9. A load supporting system in accordance with claim 8, wherein said containerized load is lowered in the midst of other containerized loads at said loading platform and is provided with an inflated tube surrounding said load's periphery to protect said load and an adjacent load, should one load collide against the other load; said inflated tube being fitted with an air relief valve.

10. A load supporting system in accordance with claim 8, wherein said mat is air-inflated, rip-resistant, has compartmentalized portions and is provided with two or more air relief valves to gradually and uniformly expel its air, as said load settles on said mat, and wherein air is permitted to pass from one compartmentalized portion to another.

11. A load supporting system in accordance with claim 1, wherein said load is provided with at least one automatic sling detachment device to enable said load to be freed of said hoisting cables, each said device comprising an upper part A and a lower part B:
wherein said upper part A comprises two exterior rotatable arm members and a central T-shaped support member; the lower inside end of each rotatable arm member being attached to a triangular teeth-shaped submember with the teeth pointing upwardly; the said three members being held together by a single low friction bolt; each of said rotatable arm members having an extention beyond said bolt and a suitable weight being pivoted at the upper end of each said extention; wherein said lower part B comprises an independent part having an upper horizontal member with a thickness greater than the thickness of said two rotatable arm members, having teeth pointing downwardly along its center portion to match the teeth of said arms of said upper part, said horizontal member being supported by two rods attached to the underside of said horizontal members at its opposite ends; said upper and lower parts having their upper and lower teeth in engagement when the rods of the lower part are attached to a load and said T-shaped member is under tension, such as when suspended by a hoist cable; when said teeth are engaged, said rotatable arms being aligned and each said suitable weight being alinged in the same traverse plane, when said load is positioned on said platform so tension on said hoist cable is relieved, said teeth being disengaged and said rotatable arms being automatically rotated by the mass of the weight, the two said parts, upper and lower, thus separating from each other, the engaged teeth being the only contacts keeping said parts together.

* * * * *

UNITED STATES PATENT AND TRADEMARK OFFICE
CERTIFICATE OF CORRECTION

PATENT NO. : 4,054,103
DATED : October 18, 1977
INVENTOR(S) : Edwin Z. Gabriel

It is certified that error appears in the above–identified patent and that said Letters Patent are hereby corrected as shown below:

Column 8, line 18, delete "is" and substitute -- and said hoisting cables are --.

Line 34, after "thicknesses" add -- of said teeth-shaped submember --.

line 43, delete "T-shaped" and substitute -- each said spring of each arm --.

line 50, delete "spring" and substitute -- springs,--.

Column 10, line 20, delete "thickness" and substitute -- thicknesses of said teeth-shaped submember --.

Signed and Sealed this

Eighth Day of April 1980

[SEAL]

Attest:

SIDNEY A. DIAMOND

Attesting Officer

Commissioner of Patents and Trademarks